(12) United States Patent
Ishimaru et al.

(10) Patent No.: US 7,130,091 B2
(45) Date of Patent: Oct. 31, 2006

(54) IMAGE READING APPARATUS AND IMAGE READING METHOD

(75) Inventors: Shuji Ishimaru, Kofu (JP); Kouji Ogino, Yamanashi-ken (JP)

(73) Assignee: Nisca Corporation, Yamanashi-Ken (JP)

( * ) Notice: Subject to any disclaimer, the term of this patent is extended or adjusted under 35 U.S.C. 154(b) by 889 days.

(21) Appl. No.: 10/189,200

(22) Filed: Jul. 5, 2002

(65) Prior Publication Data

US 2003/0007196 A1  Jan. 9, 2003

(30) Foreign Application Priority Data

Jul. 5, 2001 (JP) ............................. 2001-204913
Jul. 5, 2001 (JP) ............................. 2001-204977

(51) Int. Cl.
  H04N 1/04 (2006.01)
  H04N 1/46 (2006.01)
(52) U.S. Cl. ...................... 358/496; 358/474; 358/497; 358/505
(58) Field of Classification Search ................ 358/486, 358/497, 498, 474, 496, 505
  See application file for complete search history.

(56) References Cited

U.S. PATENT DOCUMENTS 4,447,830 A * 5/1984 Stoffel ......................... 358/462
5,513,017 A * 4/1996 Knodt et al. ................. 358/471
5,796,928 A * 8/1998 Toyomura et al. ........... 358/1.6

FOREIGN PATENT DOCUMENTS

JP  08-307704  11/1996
JP  2000-307821  11/2000

OTHER PUBLICATIONS

Patent Abstracts of Japan, Publication No. 09-261417, Date of Publication of Application: Oct. 3, 1997, Applicant: Canon Inc.
Patent Abstracts of Japan, Publication No. 2001-024850, Date of Publication of Application: Jan. 26, 2001, Applicant: Canon Inc.

* cited by examiner

*Primary Examiner*—Jeroma Grant, II
*Assistant Examiner*—Houshang Safaipour
(74) *Attorney, Agent, or Firm*—Manabu Kanesaka

(57) ABSTRACT

An image reading apparatus is provided with an optical reading device for scanning a stationary original placed on a platen to read image on the original; a drive device for moving the optical reading device at the first moving speed and the second or slow moving speed; a detection device for determining a type of image data read by the optical reading device as either the first type, i.e. monotone data, or the second type, i.e. color data; and a scan control device for obtaining and storing image data while scanning a document at the first moving speed. A switching control device switches the drive device to the second moving speed when the detecting device determines the image data read at the first moving speed to be the second type.

5 Claims, 16 Drawing Sheets

Fig. 3(a) Spectral Sensitivity Characteristics
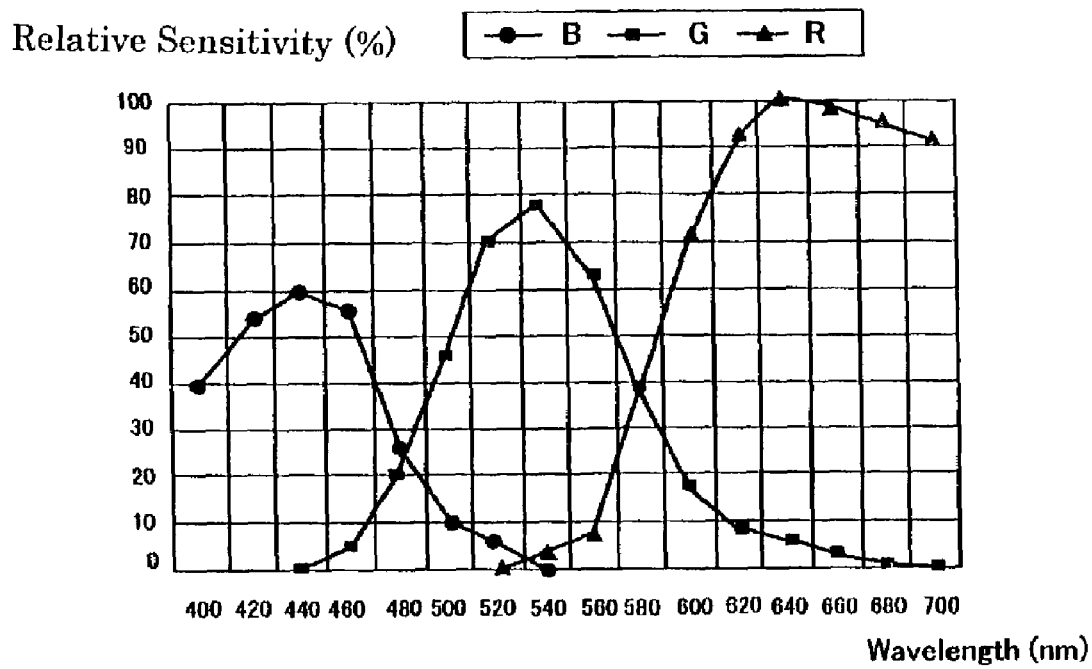
Fig. 3(b) Black/White Original Spectral Reflectance Data
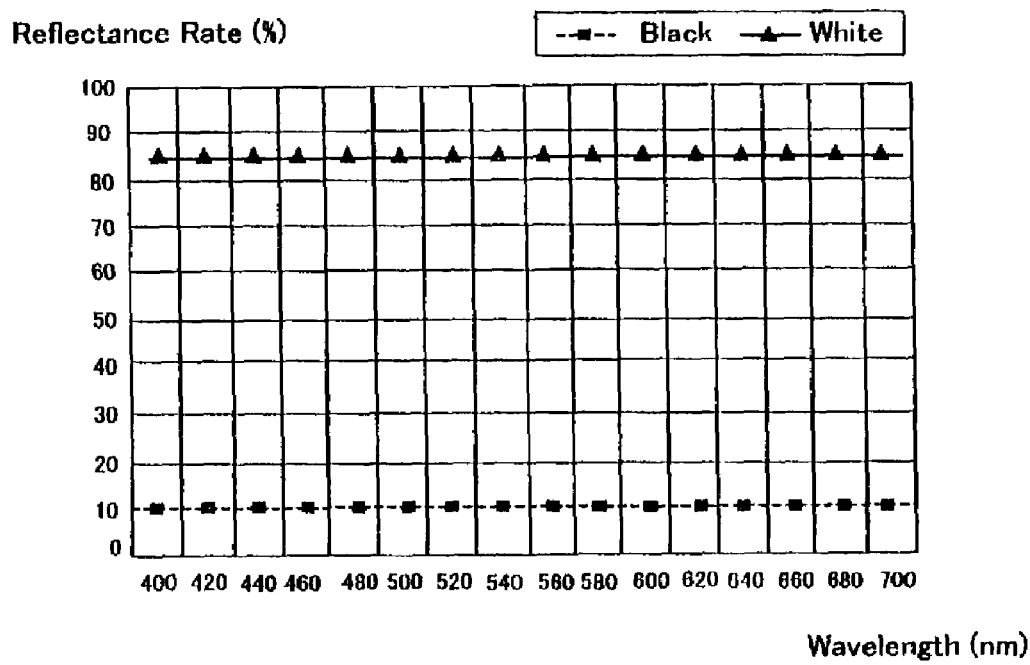

IMAGE READING APPARATUS AND IMAGE READING METHOD

BACKGROUND OF THE INVENTION AND RELATED ART STATEMENT

The present invention relates to an image reading apparatus and an image reading method in which an image on a stationary original placed on a platen is scanned and read. The present invention also relates to an image reading apparatus and an image reading method for reading an original moving over a platen with an automatic document feeder (ADF). More particularly, the present invention relates to an image reading apparatus and an image reading method that are capable of reading not only a black and white (monotone) original but also a color original.

In recent years, as more personal computers are used to handle color pictures on the internet and electronic photos, there has been an increasing demand for copying, printing and transmitting color images because of superior quality as opposed to black and white images. For that reason, an image reading apparatus has been required to quickly read a color original with high quality.

When an image reading apparatus reads a color original, normally it is necessary to read image data for each of the three primary colors, namely red (R), green (G) and blue (B). Thus, when reading a color original with the same resolution as a black and white original, the image reading apparatus has to read at a slower reading speed than that for a black and white original.

A set of originals to be read in the image reading apparatus may contain both color originals and black and white originals. When the apparatus reads such a set of originals using the color mode, a speed of reading the black and white originals will be dramatically slowed.

To solve this problem, a conventional apparatus pre-scans an original to determine whether the original is in black and white or color. Then, if the original is only in black and white, the image reading apparatus reads at a high speed in the black and white reading mode. Conversely, if the original is in color, it uses the color reading mode with a slower speed. This system is known as 'pre-scan/actual scan method'.

In Japanese Patent Publication (KOKAI) No. 09-261417, an image processing apparatus is disclosed as a modified version of the 'pre-scan/actual scan method' that requires two passes of an original. According to the invention, the reading apparatus is provided with a cycling automatic document feeder. It is determined whether the original is in black and white or color for all documents in advance through a process of transporting the originals through a reading position inside the apparatus. After storing a result of each page of the originals, a stationary reading means reads the originals in black and white at a high speed scanning. Conversely, a moving reading unit scans and reads the originals in color placed stationary on a platen to provide a higher quality.

In Japanese Patent Publication (KOKAI) No. 2001-24850, an image reading apparatus is provided with a color detection device to determine whether an original is in black and white or color. Before reading the original, it is selected to read the original in a color reading mode or in a black and white reading mode. The image reading apparatus reads the original only when a result of the color detection device matches to the reading mode.

However, in the image reading apparatus with 'pre-scan/actual scan method' including the one disclosed in Japanese Patent Publication (KOKAI) No. 09-261417, the pre-scan needs to detect whether the original is in monotone or color in advance of the actual scan to read the originals, so it takes longer reading time for the entire originals having both monotone and white documents.

Further, when the apparatus disclosed in Japanese Patent Publication (KOKAI) No. 2001-24850 is set to read in the color mode, monotone originals will not be read if the monotone originals are included in a set of the originals. Therefore, it is necessary to reset the apparatus in the monotone reading mode and read the originals in monotone one more time. Due to the additional time, the reading time for the entire set of originals also takes long.

The first object of the present invention is to provide an image reading apparatus and an image reading method that can read a set of originals containing both color and monotone documents in a shorter period of time. The apparatus has a detection function for color and monotone originals, and reads the monotone documents in a higher speed mode and the color documents in a higher quality mode.

The second object of the present invention is to provide an image reading apparatus and an image reading method that has an ADF and can read a set of originals containing both color and monotone documents in a shorter period of time. The apparatus has a detection function for the color and monotone originals, and reads the monotone documents in a higher speed mode and the color documents in a higher quality mode.

Further objects and advantages of the invention will be apparent from the following description of the invention.

SUMMARY OF THE INVENTION

In order to attain the aforementioned objects, an image reading apparatus of the present invention is provided with an optical reading device for scanning a stationary original placed on a platen to read image; a drive device for moving the optical reading device at the first moving speed or the second moving speed; a detection device for determining a type of image data read by the optical reading device as either the first type of data or the second type of data; a scan control device for obtaining and storing image data while scanning a document at the first moving speed; and a switching control device for switching the drive device to the second moving speed when the detecting device determines the image data read at the first moving speed to be the second type of data.

According to the present invention, the image reading apparatus scans and reads the image data on the stationary original placed on the platen. When reading the first type of data, for example an image on a monotone original, the image data obtained in the initial reading operation will be used, thereby eliminating the second scanning. Therefore, it is possible to read a set of originals containing both monotone originals and color originals at a higher speed.

An image reading apparatus of present invention may be provided with an optical reading device disposed at a predetermined reading position under a platen for reading a original moving on the platen; a transport device capable of re-feeding the same original to the reading position; a detecting device for determining a type of image data on the original read by the optical reading device; and a control device for control the other devices. The control device controls the other devices such that when the image data is the first type, the image data using the first reading mode is output. Further, when the image data is the second type, the original is transported (re-fed) to the reading position to be read the image data again using the second reading mode that is different from the first reading mode.

According to the present invention, the original may be re-fed to the reading position after the original is transported in the discharge direction. It is also perfectly acceptable to feed the original in an upstream direction opposite to the discharge direction, then feed the original back to the reading position again.

According to the present invention, the image reading apparatus reads the image data on the original being transported by the ADF. When reading the first type of data, for example an image on a monotone original, the image data obtained in the initial reading operation will be used, thereby eliminating the second scanning. Therefore, it is possible to read a set of originals containing both monotone originals and color originals at a higher speed.

BRIEF DESCRIPTION OF THE DRAWINGS

FIG. 3(a) is a graph showing a relationship between relative sensitivity and wavelength of color for each sensor, and FIG. 3(b) is a graph showing spectral reflectance data of a monotone document;

DETAILED DESCRIPTION OF PREFERRED EMBODIMENTS

Hereunder, embodiments of the present invention will be explained in detail with reference to the accompanied drawings.

Figure 1:
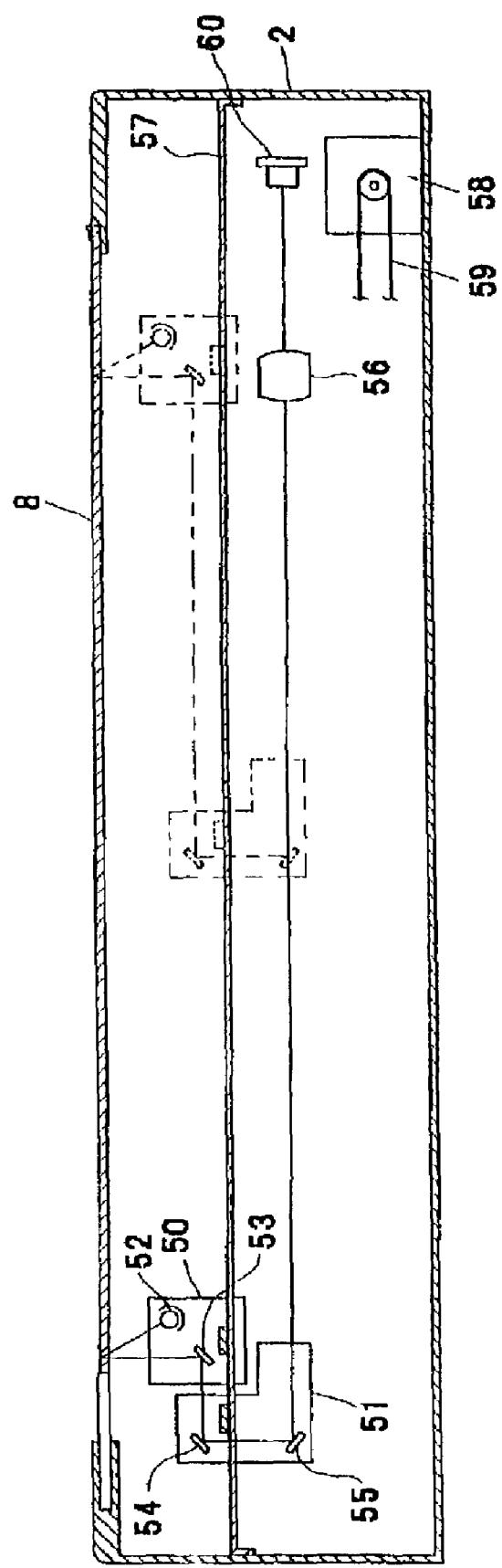
FIG. 1 is a view showing an image reading apparatus with two carriages.

FIG. 1 is view showing an image reading apparatus with two carriages according to the first embodiment of the present invention. As shown in the drawing, a reading portion of an optical reading device is composed of the first carriage 50 having a light source 52 and the first mirror 53, and the second carriage 51 for sending light reflected from the first carriage 50 to a photoelectric conversion element 60, such as a CCD via a fixed light condensing lens 56. The optical reading device has two carriages to obtain finer image data of an original placed upon a platen by maintaining a constant distance of a light path between a reading position of the original and the photoelectric conversion element 60 when the optical reading means moves under the platen to scan and read the original.

A drive mechanism for driving the two carriages is provided with a slide rail 57 for supporting and guiding the first carriage 50 and the second carriage 51, a carriage transport motor 58 and a wire 59. The wire 59 is interlocked to the reading carriage to transmit a drive force from the motor. When a control device sends a signal to rotate the carriage transport motor 58 in forward or reverse, the wire 59 reciprocally moves as it is trained on a pulley linked to a rotating shaft of the motor. Thus, the first and the second carriages 50 and 51 linked to the wire 59 move and slide in a scanning direction guided by the slide rail 57. The first carriage 50 can also move in a direction opposite to the scanning direction with a speed that can be varied by the carriage transport motor 58. In general, a pulse motor controls a rotating speed of the carriage transport motor 58 through the number of imposing pulses.

The first and second carriages 50 and 51 are configured to be able to scan at a relatively low reading speed corresponding to a color reading mode and a relatively high reading speed corresponding to a black and white reading mode. Also, by reversing the rotation of the carriage transport motor 58, the first carriage 50 can move backward, and return to the starting reading position.

Figure 2:
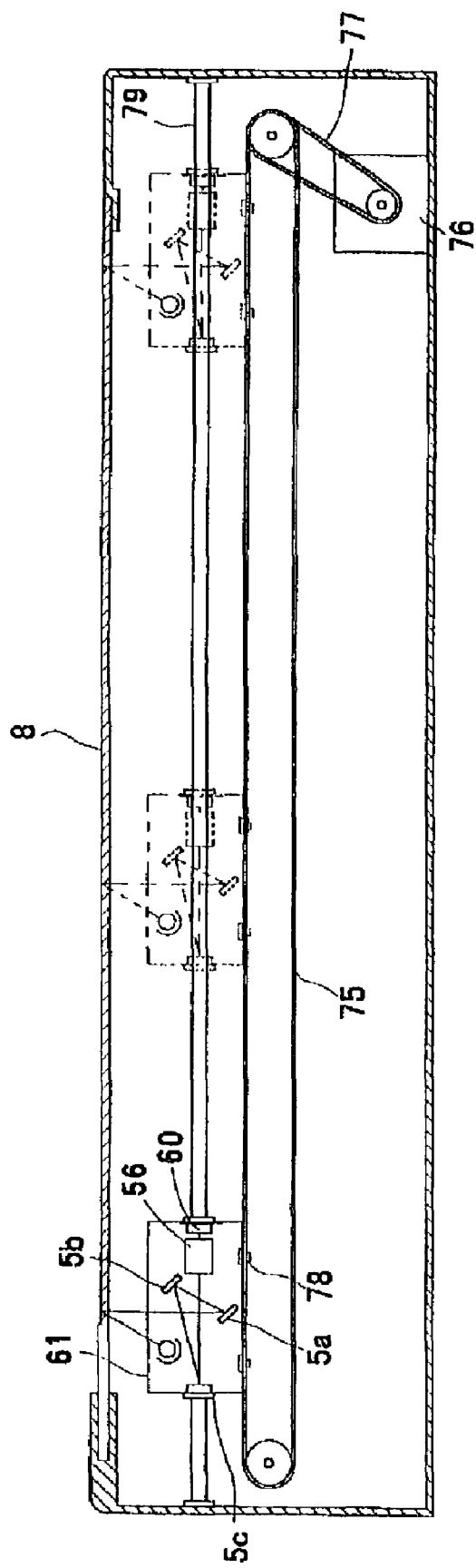
FIG. 2 is a view showing an image reading apparatus with one carriage.

FIG. 2 is a view showing an image reading apparatus with one single carriage according to the second embodiment of the present invention. FIG. 2 clearly shows a drive mechanism of an optical reading device mounted on one carriage according to the embodiment of the invention. In this case, the optical reading device, including a photoelectric conversion apparatus such as a CCD, is arranged in the single carriage.

A carriage transport mechanism according to the embodiment of the present invention is provided with a guide rail 79 for supporting and guiding a carriage 61, a carriage transport motor 76, a transport belt 75 fixed to the carriage 61 for transmitting a drive force from the motor, and the transmission belt 77 for transmitting a drive force to the transport belt 75. The carriage 61 is engaged with the transport belt 75. Therefore, when the carriage transport motor 76 rotates forward or in reverse, the transmission belts 75 and 77 transmit the rotational force of the motor 76 to move the carriage 61. A control device controls the carriage transport motor 76 to move and slide the carriage 61 in a scanning direction along the guide rail 79.

In the case of the one carriage method, similar to the two carriage method described above, the carriage 61 can move in a direction opposite to the scanning direction and slides at various speeds according to a rotating speed of the carriage transport motor 76. In general, a pulse motor controls a rotating speed of the carriage transport motor 76 through the number of imposing pulses.

Thus, the carriage 61 is configured to be able to scan with a relatively low reading speed according to a color reading mode and a relatively high reading speed according to a black and white reading mode. By reversing the rotation of the carriage transport motor 76, the carriage 61 can move backward, and return to the starting reading position.

Next, an image reading method according to the present invention will be described in detail. First, a method of determining whether an image is in monotone and color will be explained.

FIG. 3(*a*) is a graph showing a relationship between relative sensitivity and wavelength of color for each sensor, and FIG. 3(*b*) is a graph showing spectral reflectance data of a monotone document. As shown in FIG. 3(*a*), since each line sensor, R, G and B, has a spectral sensitivity peak at a different wavelength, when reading a color document, each line sensor generates maximum output at a different wavelength. On the other hand, as shown in FIG. 3(*b*), a monotone (black and white) document shows a constant spectral reflectance rate regardless of the wavelength. In the figure, each line sensor generates a constant high output for white pixels and a constant low output for black pixels. Because of this difference, it is possible to determine whether an original to be read is either in color or monotone. Note that since it is possible to determine color or not by checking the peak wavelength of the line sensor output, even when reading a document at high speed, this operation becomes possible.

In this way, a color detection unit (a determining unit) in this invention is configured to receive an output from a shading correction unit (described later) converted into a digital signal at the red, green and blue line sensors. When there is a difference in the output patterns from the sensors, it is determine to be a color document. In the case of no difference, it is determined to be a black and white document.

In the next embodiment of the present invention, an image-signal control apparatus (hereinafter referred to as a control apparatus) is provided with a data memory unit 107 (FIG. 4 and FIG. 5) to sequentially store image data read by the reading device. Depending on the type of image reading apparatus, it is possible to output image data from the reading means, without a data memory to store the image data, to an image forming apparatus after processing correction of the image data. In such a case, in applying the invention, the detection device uses the processed signal of the image data from the reading means to determine whether the image data is in monotone or color.

Figure 4:
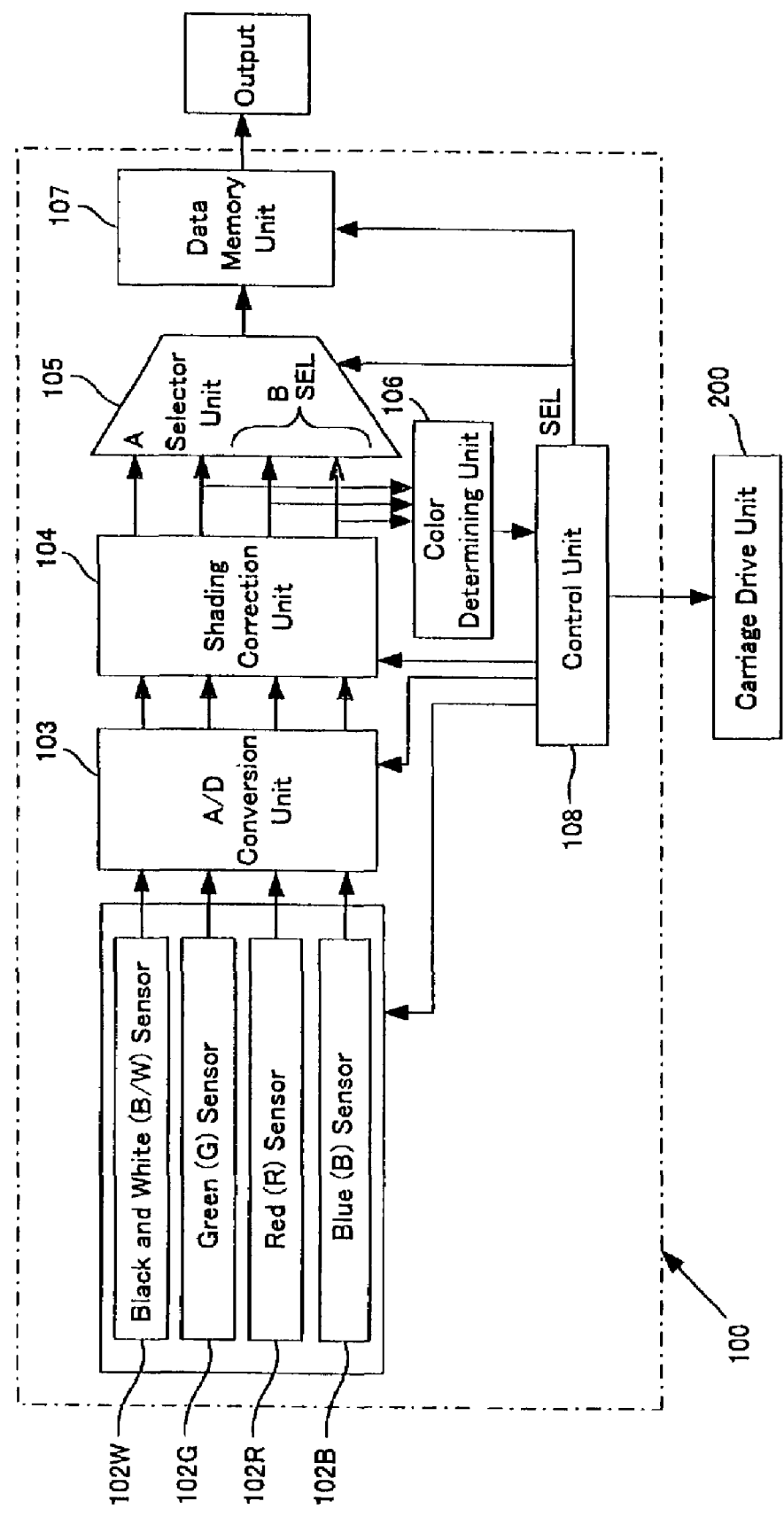
FIG. 4 is a diagram of a circuit configuration in an image signal control unit using four line image sensors including a black and white sensor.

FIG. 4 shows a circuit configuration of a control apparatus 100 having four line sensors, namely three line sensors of red (R), green (G) and blue (B) and a black and white (B/W) sensor. The control apparatus 100 shown in FIG. 4 includes an A/D conversion unit 103 to convert analog data read by the four line sensors 102W, 102R, 102G and 102B into digital data; a shading correction unit 104 for correcting a shading of the converted data (sensitivity correction between photoelectric conversion elements); a color detection unit 106 (a determining unit) for determining a gradation of the shading corrected data; a control unit 108 for receiving a result determined by the color detection unit and outputting a signal to control the image reading apparatus; a selector unit 105 for switching and outputting monotone data or color data according to a SEL signal from the control unit 108; and a data memory unit 107 for storing the image data after switching between a monotone mode and a color mode according to the SEL signal from the control unit 108, and outputting it to the image forming apparatus.

The signal coming from the control unit 108 is transmitted to a carriage drive unit 200 to control rotating directions and speeds of the carriage transport motors 58 and 78.

In the control circuit shown in FIG. 4, image data from the black and white sensor 102W is used as image data in the first reading mode (a monotone reading mode), at the same time, it is determined whether it is a color original based on the output from the green sensor 102G, the red sensor 102R and the blue sensor 102B.

Figure 5:
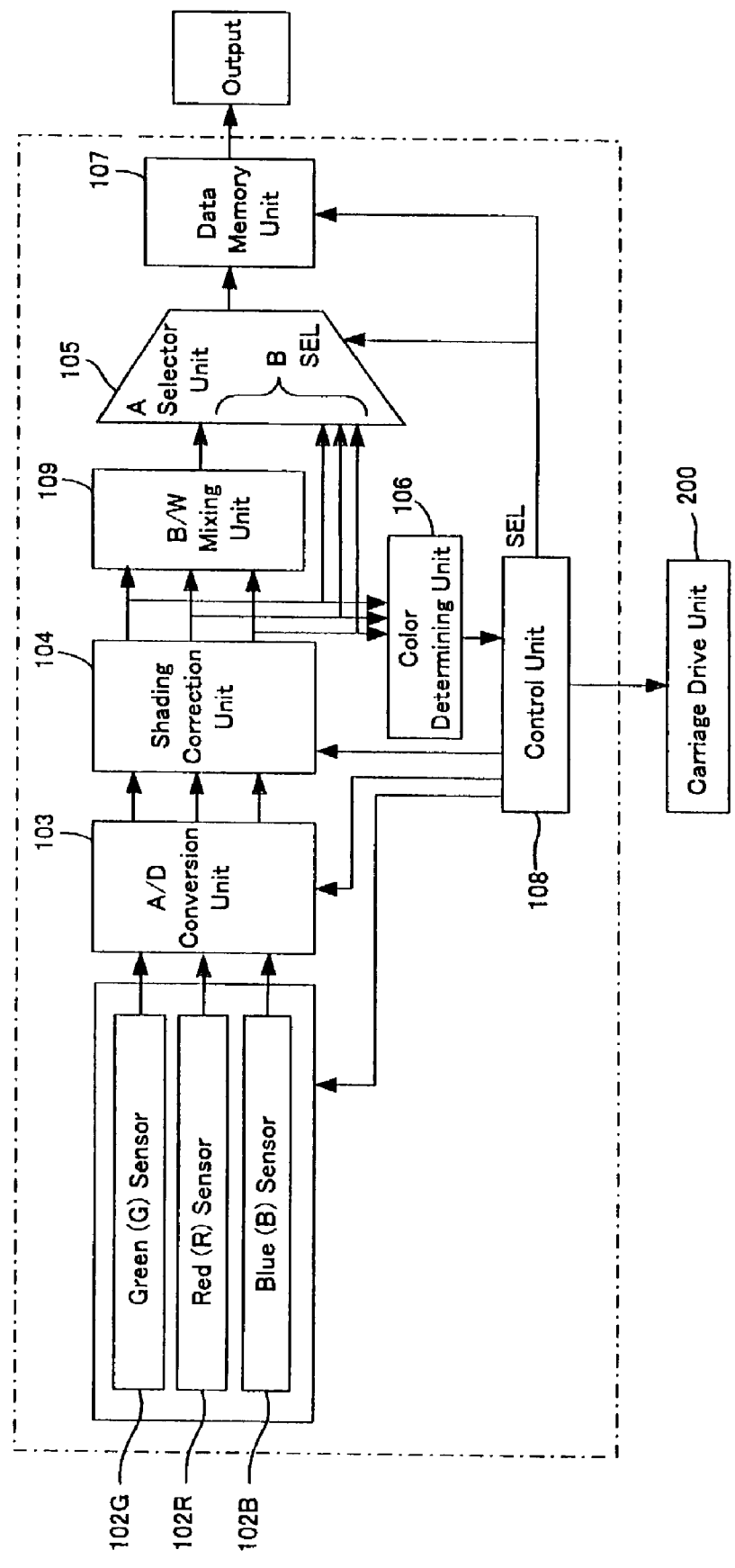
FIG. 5 is a diagram of a circuit configuration in an image signal control unit using three line image sensors.

FIG. 5 shows an image signal control unit 100*b* having three line sensors of red (R), green (G) and blue (B). The image signal control unit 100*b* includes the A/D conversion unit 103 to convert analog data read by the three line sensors 102R, 102G and 102B into digital data; the shading correction unit 104 for correcting a shading of the converted data (sensitivity correction between photoelectric conversion elements); a monotone mixing conversion unit 109 for producing a black signal based on the shading corrected data; the color detection unit 106 (the determining unit) for determining a gradation of the shading corrected data; the control unit 108 for receiving a result determined by the color detection unit and outputting a signal to control the image reading apparatus; a selector unit 105 for switching and outputting monotone data or color data according to a SEL signal from the control unit 108; and a data memory unit 107 for storing the image data after switching between a monotone mode and a color mode according to the SEL signal from the control unit 108, and outputting it to the image forming apparatus. Therefore, in the control circuit shown in FIG. 5, image data in the first reading mode (the monotone reading mode) is combined data (an AND output) from the green sensor 102G, the red sensor 102R and the blue sensor 102B. Again, based on whether there is a difference in the output patterns from the green sensor 102G, the red sensor 102R and the blue sensor 102B, it is possible to determine whether the original is in color or black and white.

Similar to the case in FIG. 4, the signal from the control unit 108 is transmitted to the carriage drive unit 200 to control the rotating direction and the speed of the carriage transport motors 58 and 78.

Therefore, the control circuit includes the color detection device for determining whether it is a color document while reading a black and white image, and the switching control device to switch the speed of the carriage transport motors 58 and 76 between a high speed and a low speed.

A flow chart of reading control according to the first and the second embodiments of the present invention will be explained next.

Figure 6:
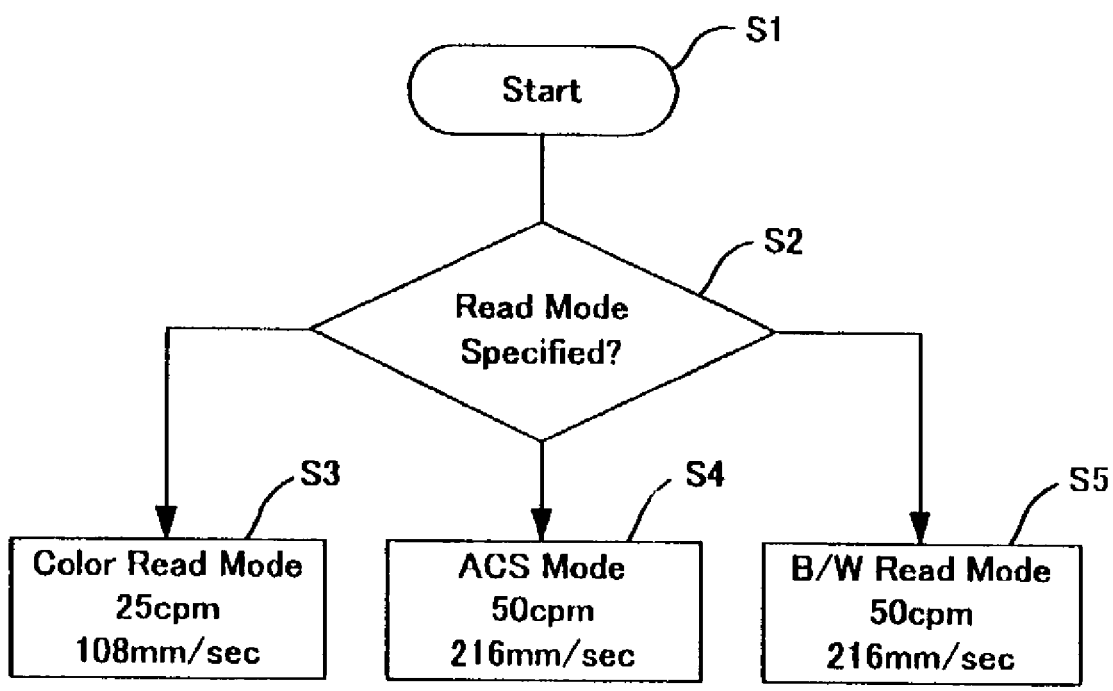
FIG. 6 is a chart showing a reading mode of the image reading apparatus.

An operator selects the reading mode (S1) shown in FIG. 6, when the image reading apparatus (S2) starts to read an original. When the color reading mode is selected (S3), the image reading apparatus reads at a low speed of the color reading mode (the carriage transport motors 58 and 76 drive the carriages at 25 CPM/108 mm/sec). When the monotone reading mode is selected (S5), the image reading apparatus reads at a high speed of the monotone reading mode (the carriage transport motors 58 and 76 drive the carriage at 50 CPM/216 mm/sec). When an auto-color select (ACS) mode is selected (S4), the reading control described below is executed according to the invention.

Figure 7:
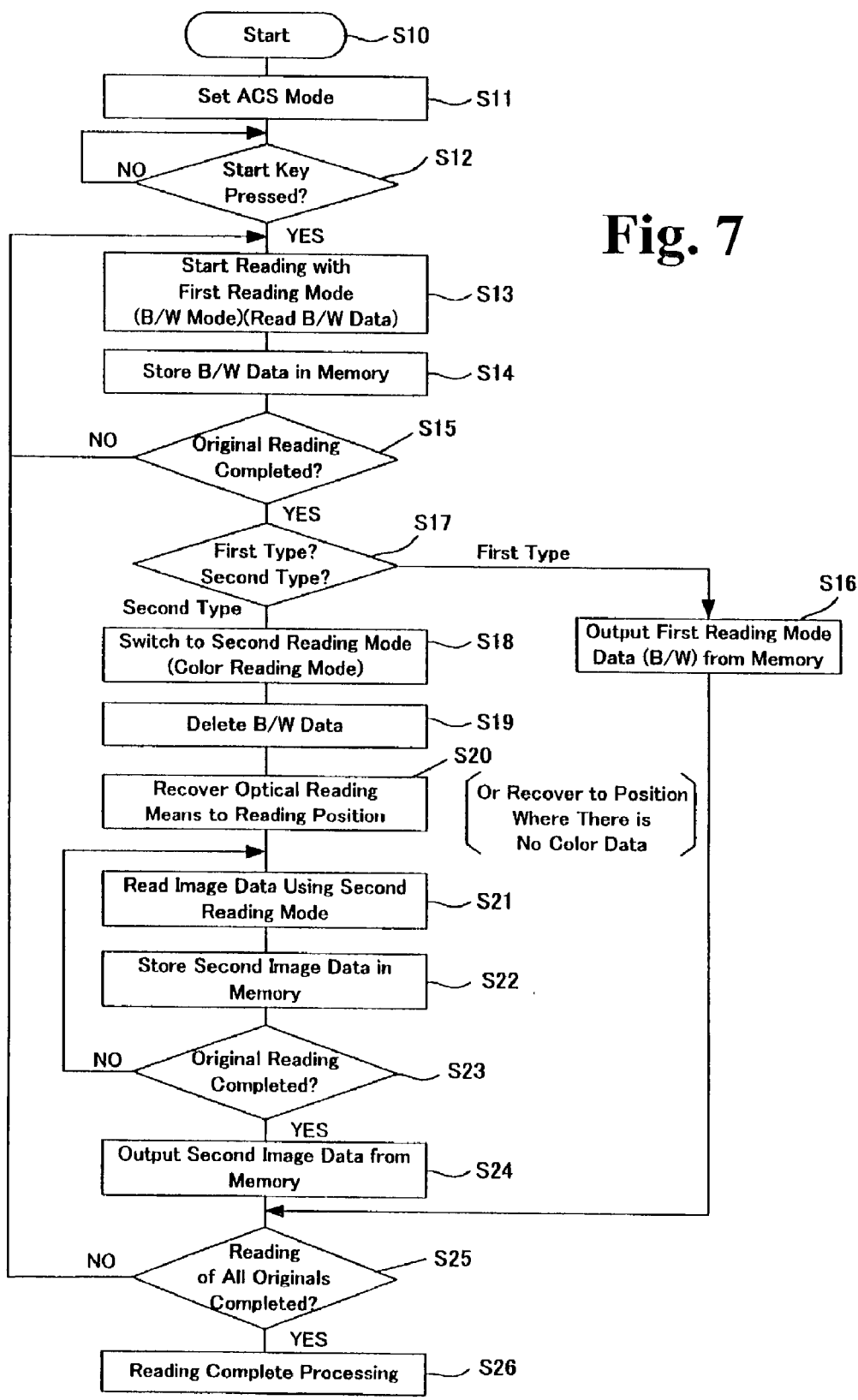
FIG. 7 is a flow chart showing the first operation control method of the image reading apparatus.

FIG. 7 shows the first control method of the image reading operation according to the present invention. A flow chart in the FIG. 7 shows the control method to determine the reading mode after reading the original using the first reading mode (the reading mode while transporting).

In FIG. 7, the reading operation starts after placing the original at a predetermined position on the platen (S10). Here, after the ACS mode is selected (S11), the image reading apparatus starts reading in the first reading mode (S13) when the start key is pressed (S12) on the apparatus. Data read in the first reading mode is stored (S14) in the memory as data of the first type (the black and white data).

The stored data is converted from an analog signal of the original read by the line sensors 102 into a digital signal by the A/D converter unit 103, as described in FIG. 4 and FIG. 5, and is processed for the shading correction at the shading correction unit 104 and output to the selector unit 105.

When the first reading of the original is completed (S15), the color detection unit 106 determines the type of stored data (S17). When it is determined that the data is the first type (the black and white data), the image data stored in the data memory 107 is output to the image forming apparatus (S16) and the reading of the original image is completed.

Next, if the image data stored in the data memory 107 is the second type of data (the color data), the reading mode is switched from the first reading mode to the second reading mode (the color reading mode) to read the original at a slower speed (S18). The image data (the black and white data) previously read in the first reading mode and stored in the data memory unit 107 as the black and white data is deleted (S19).

Then, either the optical reading device is returned to the reading start position or to the original position that does not include the color data (S20), and the apparatus starts reading in the second reading mode (the color reading mode) (S21).

The second reading mode (the color reading mode) is performed at a slower speed than the first reading mode (the monotone mode). The image data of the original (the color image data) is stored sequentially in the data memory (S22). As the reading of the originals continues, the original reading operations (S21 and S22) are performed. When the reading of the images on the original in the second reading mode is completed (S23), the color image data stored in the data memory 107 is output to the image forming apparatus (S24). There, if a new original is placed on the platen, the reading operation is performed (S25 and S26).

As described in detail above, the image reading apparatus of the first and second embodiments are provided with the optical reading device for scanning a stationary original placed on a platen to read image data; the drive device for moving the optical reading means at the first moving speed and the second moving speed; the detection device for determining a type of image data read by the optical reading means as either the first type of data or the second type of data; the scan control device for obtaining and storing image data while scanning a document at the first moving speed; and the switching control device for switching the drive device to the second moving speed when the detecting device determines the image data read at the first moving speed to be the second type of data.

The first type data is the black and white image data, and the second type data is the color image data. The first type is binary scale image data, and the second type data can also be applied to a document including multiple grading color images.

According to the present invention, the image reading apparatus scans and reads the image data on the stationary original placed on the platen. When reading the first type of original (the monotone original), the image data obtained in the initial reading operation will be used, thereby eliminating the second scanning. Therefore, it is possible to read a set of originals containing both the first type and the second type (the monotone and color originals) at a high speed.

Figure 8:
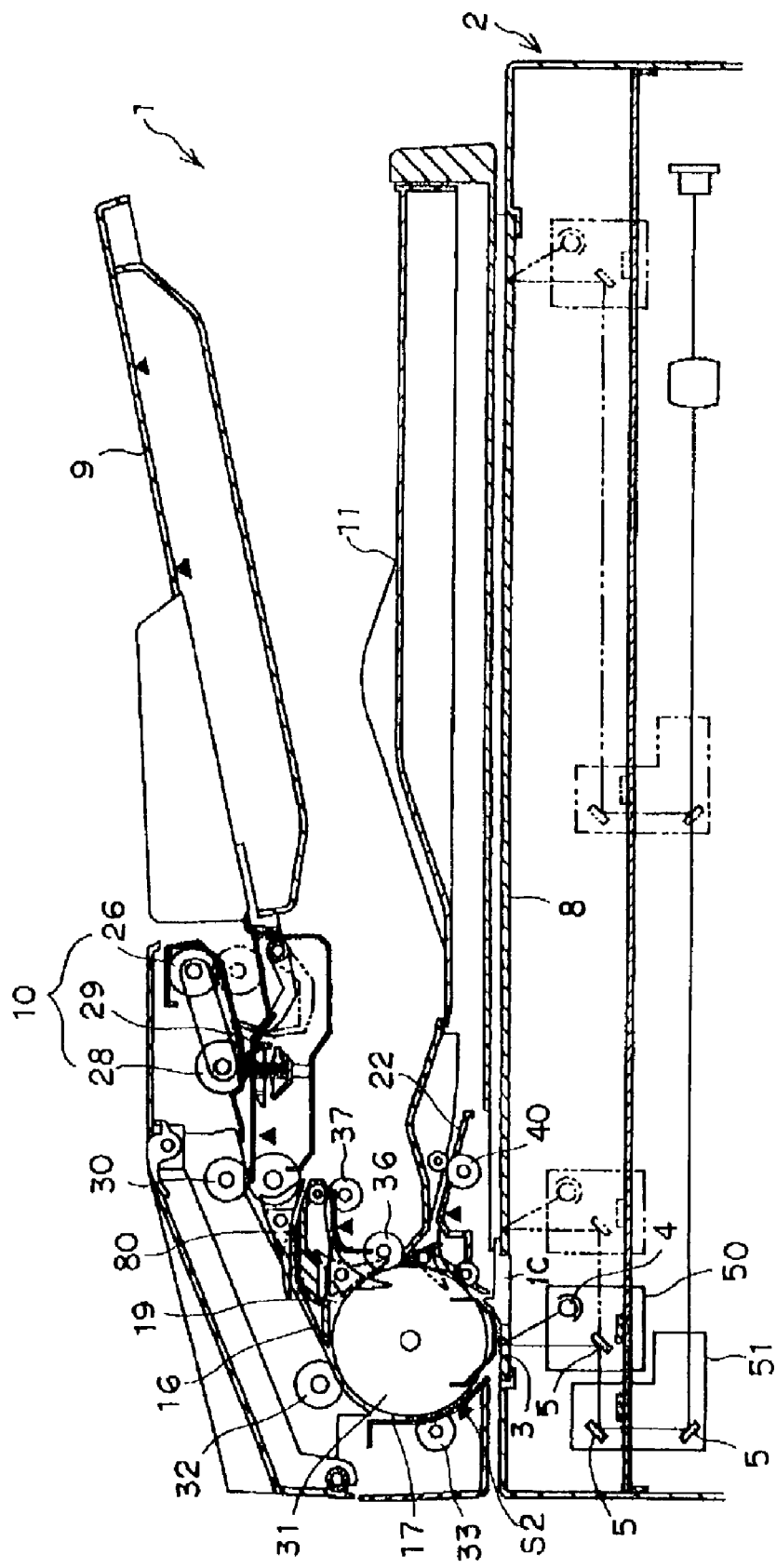
FIG. 8 is a view showing an image reading apparatus with an ADF.

In the first and the second embodiments, the image reading apparatus reads the originals placed on the platen 8 by moving the optical reading device such as the carriages 50 and 51. In the following description, an image reading apparatus has an optical reading device at a fixed position and an automatic document feeder (or ADF) for transporting an original to the reading position to read the original while moving. In FIG. 8 and the subsequent drawings, such an image reading apparatus and image reading method will be explained as the third and the fourth embodiments of the present invention.

Note that in the following explanation for the third and fourth embodiments, the same members are used to denote the same components and configurations as those in the first and the second embodiments, thus explanations of the numbers shall be omitted for simplicity. The explanation will focus on the differences between the embodiments.

Figure 9:
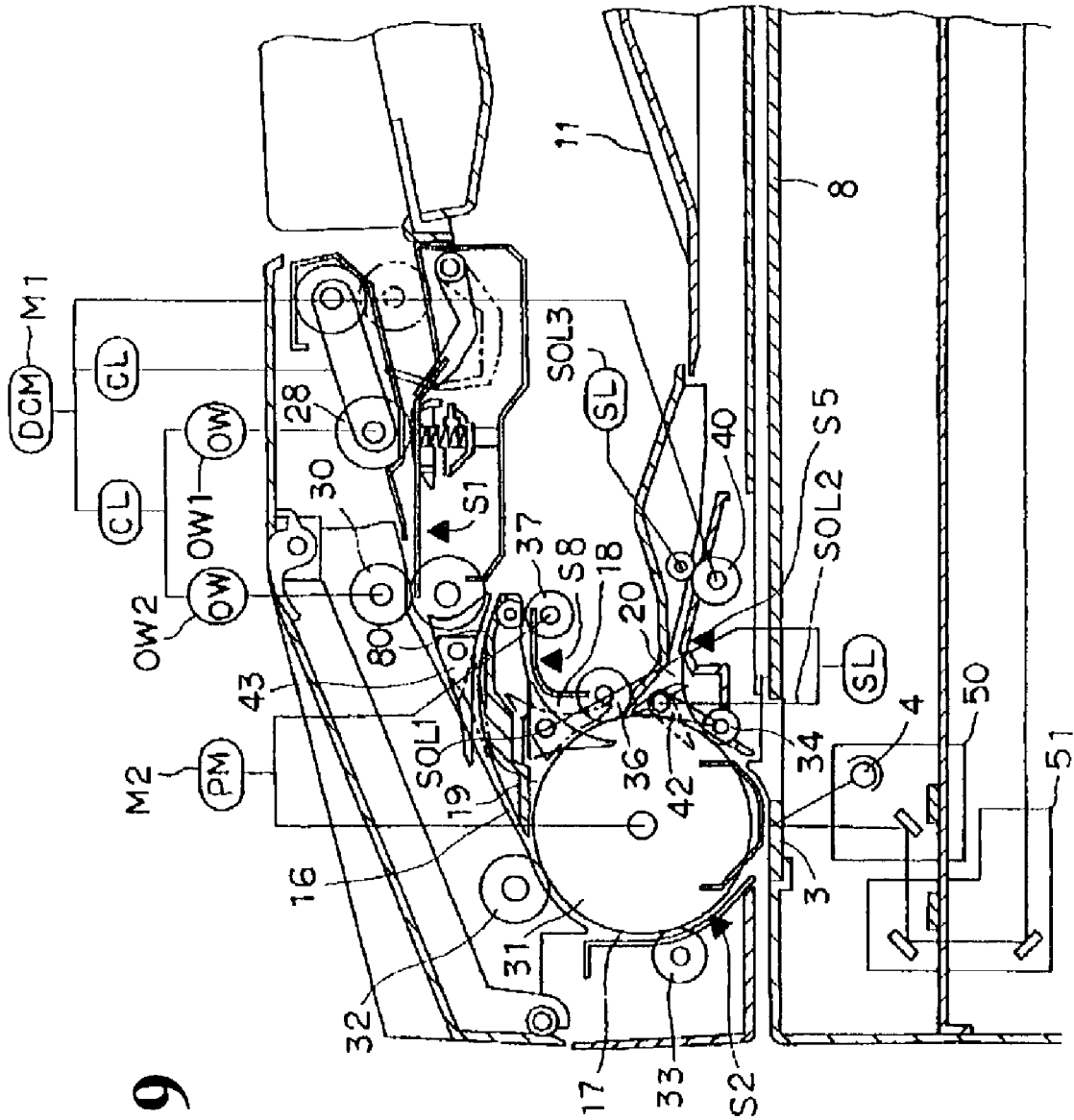
FIG. 9 is a view showing a transporting mechanism of the ADF shown in FIG. 8.

FIG. 8 is a sectional view showing an ADF and a reading device of an image reading apparatus according to the third embodiment of the present invention. As seen in FIG. 8, the image reading apparatus of the third embodiment of the present invention is equipped with an ADF and a reading device 2. FIG. 9 shows an original transport mechanism of the ADF.

An ADF 1 is mounted on the reading device 2 and transports the original to a second platen 3 on the reading device 2.

The reading device 2 irradiates light from a light source 4, such as a lamp, onto the transported original through platen 3 (FIG. 8). The light is reflected by a plurality of mirrors 5 and a light condensing lens 6 forms an image to be read at an image sensor, which is a reading unit such as a CCD. In other words, the second platen 3 is a reading position (or a reading area) of the reading device 2. Also, the reading apparatus 2 is also equipped with the first platen 8 having an enough area to cover a large document completely, as described in the first and the second embodiments. The reading device 2 is capable of reading an image on a thick, book-like original at the first platen 8 by opening the ADF 1 and moving the reading carriages of the first carriage 50 comprising the light source 4 and the light condensing mirror 5 and the second carriage 51 in the sub-scanning direction.

The ADF 1 is equipped with a sheet supply tray 9 for placing a plurality of originals, a sheet supply device 10 for supplying the originals stacked on the sheet supply tray 9 one at a time to the reading position, and a discharge tray 11 for storing the originals discharged from the reading apparatus.

The ADF 1 includes a sheet supply path 16 for supplying the originals on the sheet supply tray 9 one at a time toward the reading position on the second platen 3; a transport path 17 integrated with the sheet supply path 16 for guiding the originals to the second platen 3; a discharge path 18 connected to a discharge outlet on the sheet discharge tray 11 from the transport path 17; a recycling path 19 connected to a connection portion of the sheet supply path 16 and the transport path 17 from the discharge outlet on the sheet discharge tray 11 for returning the originals to the transport path 17; an intermediate path 20 branched from the discharge path 18 for guiding the original from the transport path 17; and a switch back path 22 to switch back the originals from the intermediate path 20 and feed them in a reverse direction.

In a duplex mode to read both sides of the original, a switch back roller 40 rotates in reverse while nipping a trailing edge of the original to change a transport direction of the original to switch back the front and back sides, and sends the original to the reading position on the second platen 3 through the recycling path 19.

Further, the ADF 1 has an idling path 80 wherein the original is temporarily inserted when the reading thereof is interrupted, the transport of the original is stopped, the transport rollers 31 rotate in reverse, and the original is switched back and fed toward the discharge tray 11.

A document transport device in the apparatus can (re-feed) return the document to a predetermined reading position. In this way, a process of re-feeding the original may include returning the original to the reading position after transporting in the discharge direction, or returning the original to the reading position after transporting the original in the upstream direction opposite to the discharge direction.

As is clearly illustrated in FIG. 9, the sheet supply path 16 is provided with a draw-out roller 26 for drawing out the original; a sheet supply roller 28 for supplying the original drawn out by the draw-out roller 26; a separating member 29 for allowing the sheet supply roller 28 to supply only the uppermost original; and a pair of register rollers 30 for feeding the original in the downstream direction after aligning a leading edge of the original supplied by the sheet supply roller 28.

The draw-out roller 26 and the sheet supply roller 28 are interlocked to the sheet supply motor M1 via a one-way clutch OW1. Also, the register roller 30 is interlocked to a sheet supply motor M1 via a one-way clutch OW2. The sheet supply motor M1 rotates the draw-out roller 26 and the sheet supply roller 28 with the forward rotation of its drive shaft and rotates the register roller 30 with the reverse rotation of its drive shaft.

In the transport path 17 are arranged a large diameter transport roller 31, and a plurality of follower rollers 32, 33 and 34 pressed against an outer circumference of the transport roller 31. The transport roller 31 is driven by the forward and reverse driving transport motor M2.

In the discharge path 18 are arranged a follower roller 36 pressed against the transport roller 31 and a pair of discharge rollers 37 for discharging the originals to the discharge tray 11. The transport roller 37 is interlocked to a transport motor M2 with forward and reverse rotation capability.

Also, as described above, the switch-back path 22 is formed below the discharge path 18. A pair of switch-back rollers 40 located in the switch-back path 22 is configured so that one switch-back roller 40 is away from the other switch-back roller 40 by a pressing solenoid SOL3 so that the original can be transported without interference when leading and trailing edges of the original being re-fed through the recycling path 19 and the transport path 17 are crossed. The switch-back roller 40 is interlocked to the transport motor M1 with forward and reverse rotation capability.

Further, when the original detection device determines the original to be a color document and to be re-read, the control device instructs to stop reading the original, and to rotate the large diameter transport roller 31 in reverse to feed back the original to temporally stay in the idling path 80 disposed above the discharge path 18.

The second flapper 42 is arranged at downstream of the transport path 17 to guide the original to either the discharge path 18 or to the switch-back path 22. The second flapper 42 is driven by the second solenoid SOL 2. Also arranged above the discharge path is a flapper 43 that moves upward by the trailing edge of the original fed in reverse and guides the original into the idling path. When the trailing edge of the original passes through, the flapper moves downward by its own weight.

An empty sensor S1 to detect the originals on the sheet supply tray 19, a read sensor S2, a sheet discharge sensor S8 and a switch-back sensor S5 are connected to the control device (the control unit). Also, the sheet supply motor M1 and the transport motor M2 are connected to the control device (not shown in the drawings). The pressing solenoid SOL 1, the second solenoid SOL 2 and the third solenoid SOL 3 are also connected to the control device. The control device has a central processing unit (or CPU) to control the transport of the original.

The control device executes the transport of the original as described above by controlling each of the motors M1, M2 and each of the solenoids SOL 1 to SOL 3 according to the output signals from each of the sensors S1 to S8 and the original detection device.

According to the fourth embodiment of the present invention, an ADF 1*b* and a reading device 2*b* will be explained with reference to FIG. 10 and FIG. 11.

Figure 10:
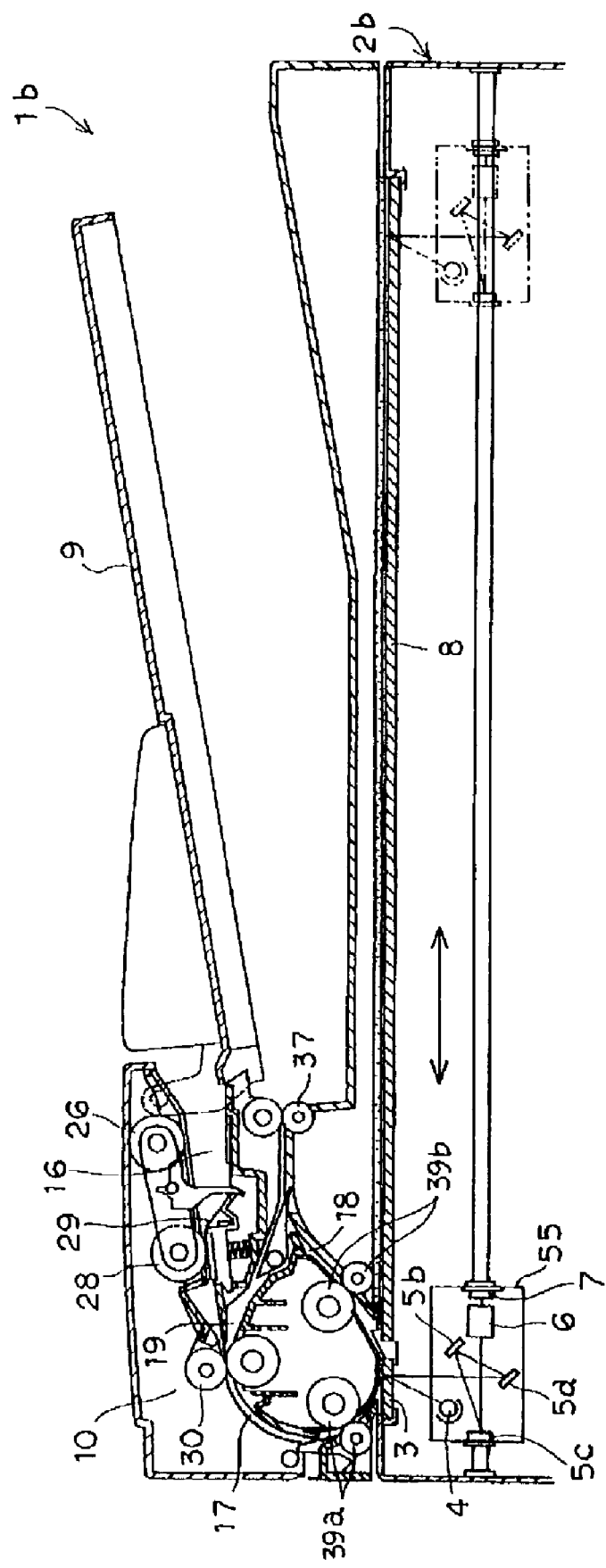
FIG. 10 is a view showing another image reading apparatus with an ADF.
Figure 11:
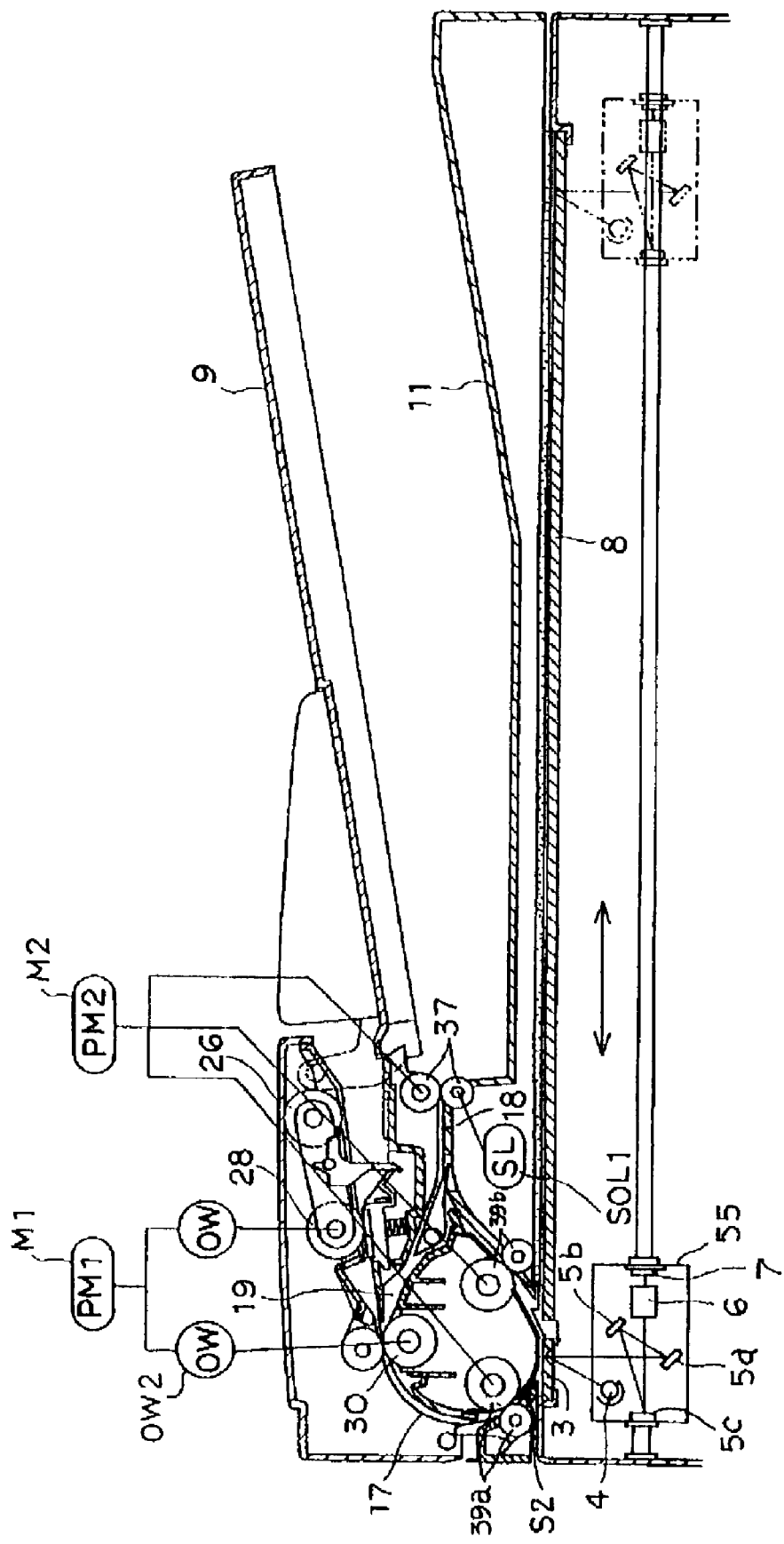
FIG. 11 is a view showing a transporting mechanism of the ADF shown in FIG. 10.

As shown in FIG. 10, an image reading apparatus is equipped with the ADF 1*b* and the reading device 2*b* as the fourth embodiment of the apparatus. FIG. 11 shows an original transport mechanism of the ADF. ADF 1*b* is mounted on the reading apparatus 2*b* to transport the originals to pass over the second platen glass 3 on the image reading apparatus 2*b*.

An optical reading device disposed in the reading apparatus 2*b* has a light source 4, mirrors 5*a*, 5*b* and 5*c*, a condensing lens and an image sensor 7 in the carriage 55. When reading the image data on the original transported by the ADF 1*b*, the carriage is positioned below the platen 30. The light source 4 arranged along a main scanning direction of the original irradiates light on the original, and the light reflected by the first mirror 5*a*, the second mirror 5*b* and the third mirror 5*c* is sent to the condensing lens 6. The image sensor receives the light focused by the condensing lens 6. When reading a thick original, such as a book, the optical reading device, which is provided with the light source, mirrors, the condensing lens 6 and the image sensor 7 in the carriage 55 as shown in FIG. 10, moves from left to right (the sub-scanning direction) under the first platen 8 to read the image data on the original surface.

An operational control of the carriage 55 is as described for the second embodiment. The image data, which is the light received by the image sensor, is converted to a digital signal in the reading device 2*b* and then sent to an image forming apparatus G, such as a copier.

The ADF 1*b* is equipped with a sheet supply device for drawing out the originals stacked on the sheet supply tray 9 one at a time to supply the originals in a determined sheet supply direction; a transport device positioned below the sheet supply tray 9 for passing the originals over the second platen 3 in the image reading portion while rotating the originals; and a discharge device for discharging the originals after passing the second platen 3 to the discharge tray 11. Also, the ADF 1*b* is supported to be able to rotate at the downstream side of the direction of sheet supply. The two drive motors M1 and M2 drive the sheet supply device, the transport device and the discharge device (See FIG. 11).

Further, the ADF 1*b* has the sheet supply path 16 for supplying the originals stacked on the sheet supply tray 9 one at a time toward the reading position on the second platen 3, the transport path 17 integrated with the sheet supply path 16 for guiding the original to the second platen 3, and the discharge path 18 connected from the transport path 17 to the discharge outlet of the discharge tray 11.

In the sheet supply path 16 are arranged the draw-out roller 26 for drawing out the originals, the sheet supply roller 28 for supplying the originals drawn out by the draw-out roller 26, the separating member 29 for allowing the sheet supply roller 28 to supply only the uppermost original, and a pair of the register rollers 30 for feeding the original supplied by the sheet supply roller 28 after aligning the leading edge thereof.

The draw-out roller 26 and the sheet supply roller 28 are interlocked to the sheet supply motor M1 via the one-way clutch OW1. Also, the register roller 30 is interlocked to the sheet supply motor M1 via the one-way clutch OW2. The sheet supply motor M1 rotates the draw-out roller 26 and the sheet supply roller 28 with the forward rotation of its drive shaft and rotates the register roller 30 with the reverse rotation of its drive shaft.

In the transport path 17 are arranged the transport rollers 39*a* and 39*b*. The transport motor M2 drives the transport rollers 39*a* and 39*b* in the forward and reverse driving.

The discharge roller 37 is interlocked to the transport motor M2. When the duplex mode is selected to read both sides of the original, the discharge roller 37 rotates in reverse while nipping the trailing edge of the originals to switch-back the original and send it to the transport path 17 via the recycling path 19. A pair of the discharge rollers is configured so that one discharge roller 37 is away from the other discharge roller 37 by the pressing solenoid SOL1 so that the original can be transported without interference when the leading and trailing edges of the original recycled through the recycling path 19 and the transport path 17 cross. Also, the discharge path 18 and the paired discharge rollers 37 have the switch-back function to switch the direction of the originals from front to back.

When the original detection device determines a type of original and it is necessary to re-read the original (for example when switching from the monotone reading mode to the color reading mode), the control means stops the reading of the original and transports it to the discharge path 18. The original transported to the discharge path 18 is transported again to the second platen 3 by switching it in the recycling path 19, via the transport path 17. The back and front sides of the original transported again in this manner are now inverted to read the backside of the original. For that reason, in order to read a surface of the original when interrupted, the original is transported from the transport path again to the discharge path to be switched back and fed back to the reading position on the second platen 3 via the recycling path 19. In this way, the original is transported and set at the reading position on the second platen 3 to be read at a control speed (for example the slower speed in the color reading mode).

The empty sensor (not shown in the drawings), the read sensor S2, the discharge sensor (not shown in the drawings), and the switch-back sensor (not shown in the drawings) are connected to the control apparatus (the control unit). Also, the supply motor M1 and the transport motor M2 are connected to the control apparatus (not shown in the drawings). The pressing solenoid SOL 1 is also connected to the control apparatus. The control apparatus has a central processing unit (or CPU) to control the transport of the original.

The control apparatus executes the transport of the original by controlling each of the motors of M1, M2 and the solenoid SOL 1 according to the output signals from the sensor S2 and the original detection device.

As explained for the first and the second embodiments in FIG. 3, to determine whether the image read is in monotone or color, the wavelengths from each of the line sensors are checked to be different or to be uniform. In the same way as described according to FIG. 3, it is possible to determine based on the image data read at the high speed in monotone reading mode.

In this way, the color detection unit (the determining unit) in this invention is configured to receive an output from a shading correction unit (described later) converted into a digital signal at the red, green and blue line sensors. When there is a difference in the output patterns from the sensors, it is determined to be a color document. In the case of no difference, it is determined to be a black and white document.

As shown in FIG. 4 and FIG. 5, the image-signal control apparatus (hereinafter referred to as a control apparatus) is provided with a data memory unit 107 (FIG. 12 and FIG. 13) to sequentially store image data read by the reading device.

Depending on the type of image reading apparatus, it is possible to output image data from the reading means, without a data memory to store the image data, to an image forming apparatus after processing correction of the image data. In such a case, in applying the invention, the detection device uses the processed signal of the image data from the reading means to determine whether the image data is in monotone or color.

Figure 12:
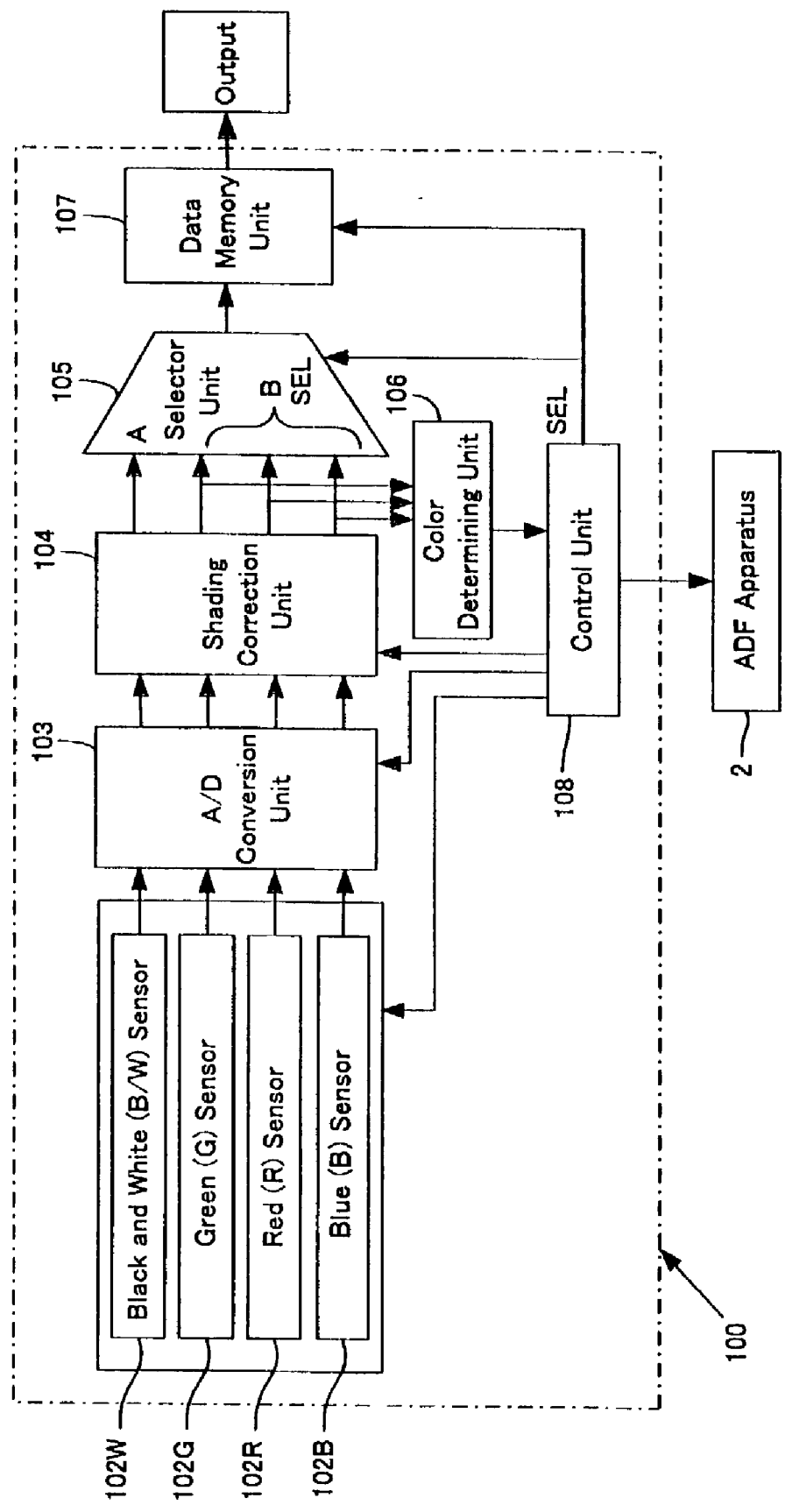
FIG. 12 is a diagram of a circuit configuration in an image signal control unit using four line image sensors including a black and white sensor in the image reading apparatus with the ADF.

FIG. 12, substantially the same as FIG. 4, shows the circuit configuration of a control apparatus 100 having four line sensors, namely three line sensors of red (R), green (G) and blue (B) and a black and white (B/W) sensor. The control apparatus 100 shown in FIG. 4 includes an A/D conversion unit 103 to convert analog data read by the four line sensors 102W, 102R, 102G and 102B into digital data; a shading correction unit 104 for correcting a shading of the converted data (sensitivity correction between photoelectric conversion elements); a color detection unit 106 (a determining unit) for determining a gradation of the shading corrected data; a control unit 108 for receiving a result determined by the color detection unit and outputting a signal to control the image reading apparatus; a selector unit 105 for switching and outputting monotone data or color data according to a SEL signal from the control unit 108; and a data memory unit 107 for storing the image data after switching between a monotone mode and a color mode according to the SEL signal from the control unit 108, and outputting it to the image forming apparatus.

The signal coming from the control unit 108 is transmitted to a carriage drive unit 200 to control rotating directions and speeds of the carriage transport motors 58 and 78.

Figure 13:
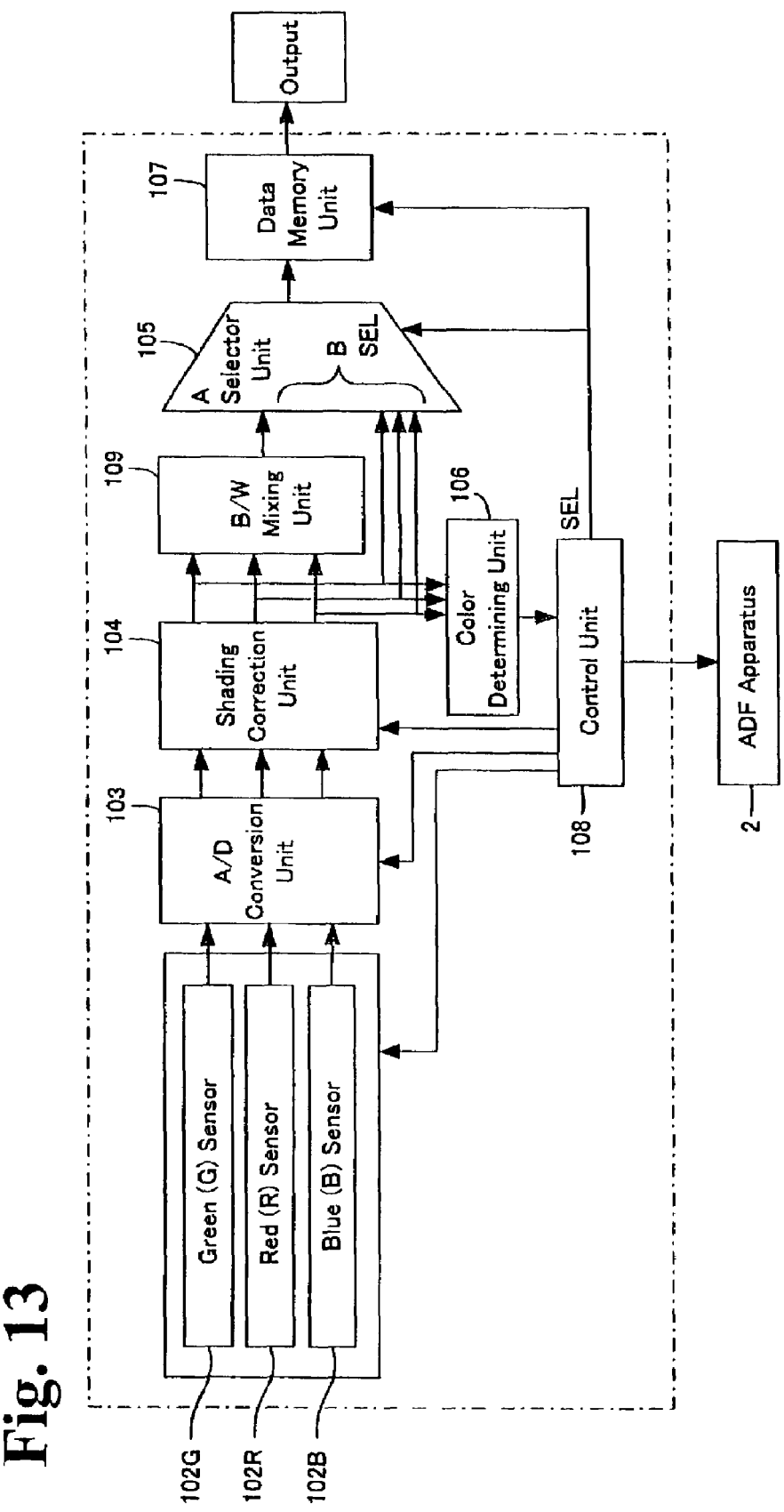
FIG. 13 is a diagram of a circuit configuration in an image signal control unit using three line image sensors in the image reading apparatus equipped with the ADF.

FIG. 13 shows the image signal control unit 100*b* having three line sensors of red (R), green (G) and blue (B). The image signal control unit 100*b* includes the A/D conversion unit 103 to convert analog data read by the three line sensors 102R, 102G and 102B into digital data; the shading correction unit 104 for correcting a shading of the converted data (sensitivity correction between photoelectric conversion elements); a monotone mixing conversion unit 109 for producing a black signal based on the shading corrected data; the color detection unit 106 (the determining unit) for determining a gradation of the shading corrected data; the control unit 108 for receiving a result determined by the color detection unit and outputting a signal to control the image reading apparatus; a selector unit 105 for switching and outputting monotone data or color data according to a SEL signal from the control unit 108; and a data memory unit 107 for storing the image data after switching between a monotone mode and a color mode according to the SEL signal from the control unit 108, and outputting it to the image forming apparatus. Therefore, in the control circuit shown in FIG. 13, image data in the first reading mode (the monotone reading mode) is combined data (an AND output) from the green sensor 102G, the red sensor 102R and the blue sensor 102B. Again, based on whether there is a difference in the output patterns from the green sensor 102G, the red sensor 102R and the blue sensor 102B, it is possible to determine whether the original is in color or black and white.

Similar to the case in FIG. 13, the signal from the control unit 108 is transmitted to the carriage drive unit 200 to control the rotating direction and the speed of the carriage transport motors 58 and 78.

A flow chart of reading control according to the embodiment of the present invention will be explained next.

Figure 14:
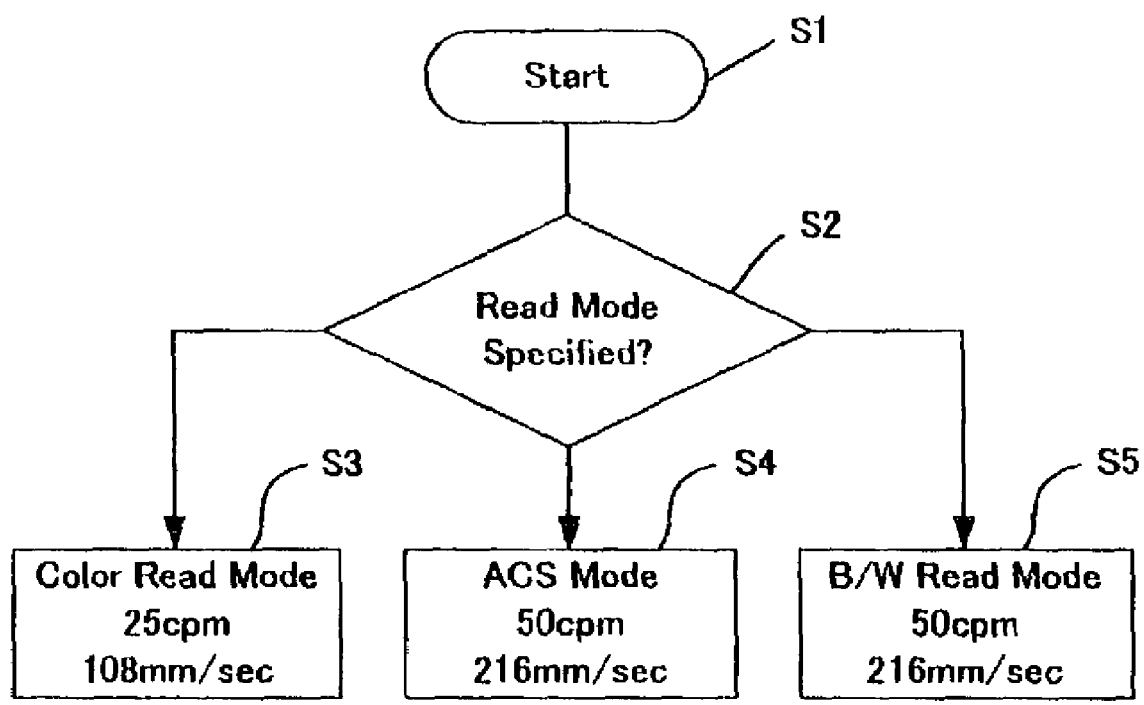
FIG. 14 is a chart showing a reading mode of the image reading apparatus equipped with the ADF.

An operator selects the reading mode (S1) shown in FIG. 14, when the image reading apparatus (S2) starts to read an original. When the color reading mode is selected (S3), the image reading apparatus reads at a low speed of the color reading mode (25 CPM/108 mm/sec). When the monotone reading mode is selected (S5), the image reading apparatus reads at a high speed of the monotone reading mode (50 CPM/216 mm/sec). When an auto-color select (ACS) mode is selected (S4), the reading control described below is executed according to the invention.

Figure 15:
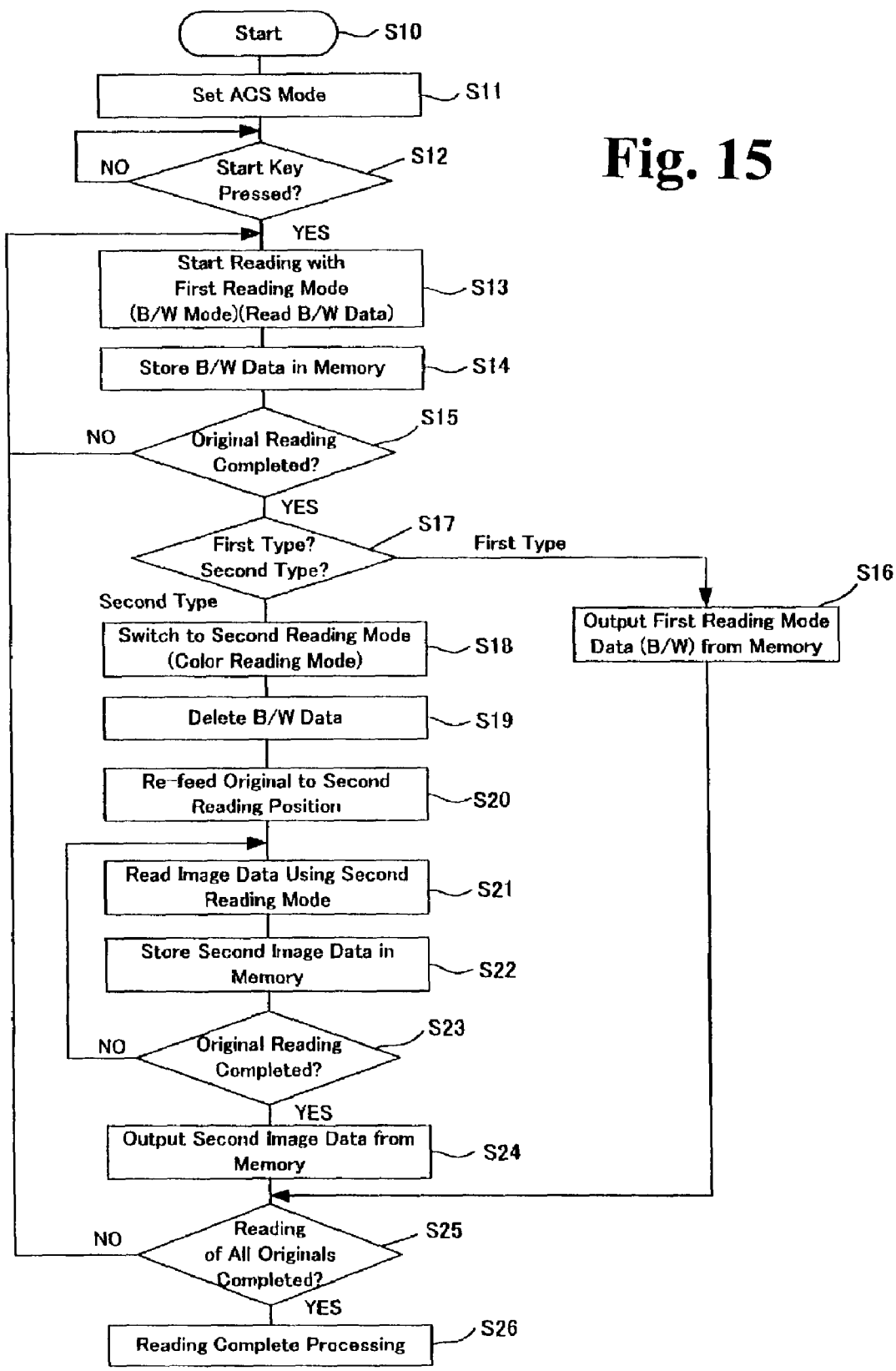
FIG. 15 is a flow chart showing the second operation control method of the image reading apparatus.

FIG. 15 shows the second control method of the image reading operation according to the present invention. A flow chart shows the control method to determine the reading mode after reading the original using the first reading mode (the reading mode while transporting).

Figure 16:
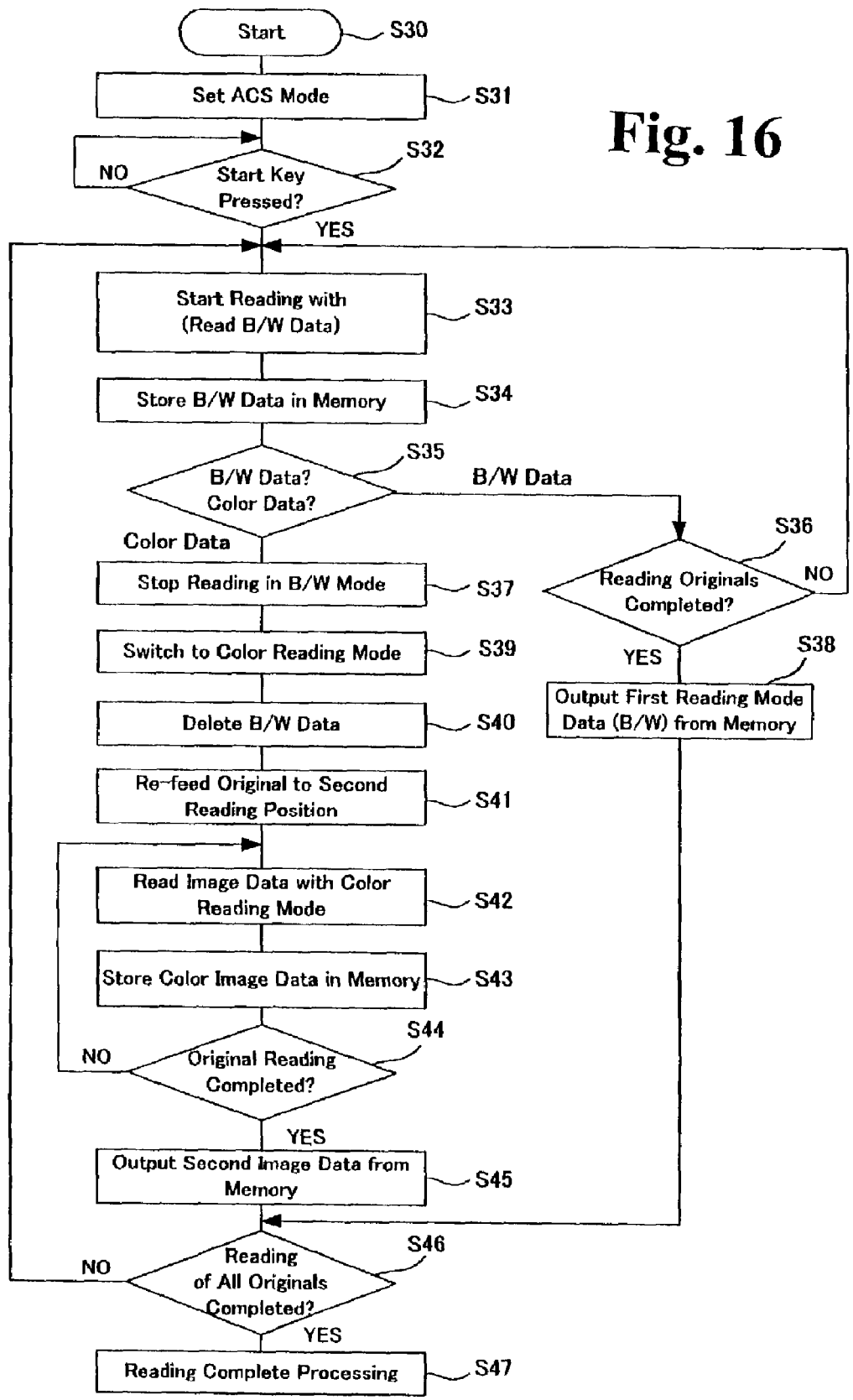
FIG. 16 is a flow chart showing the third operation control method of the image reading apparatus.

FIG. 16 shows the third control method of the image reading operation according to the present invention and shows a flow chart of the control method to determine the reading image data mode while reading the original In FIG. 14, the reading operation starts after placing the original at a predetermined position on the platen (S10). Here, after the ACS mode is selected (S11), the image reading apparatus starts reading in the first reading mode (S13) when the start key is pressed (S12) on the apparatus. Data read in the first reading mode is stored (S14) in the memory as data of the first type (the black and white data). The stored data is converted from an analog signal of the original read by the line sensors 102 into a digital signal by the A/D converter unit 103, as described in FIG. 12 and FIG. 13, and is processed for the shading correction at the shading correction unit 104 and output to the selector unit 105.

When the first reading of the original is completed (S15), the color detection unit 106 determines the type of stored data (S17). When it is determined that the data is the first type (the black and white data), the image data stored in the data memory 107 is output to the image forming apparatus (S16) and the reading of the original image is completed. Then, the original is discharged to the discharge path 18.

Next, if the image data stored in the data memory 107 is the second type of data (the color data), the reading mode is switched from the first reading mode to the second reading mode (the color reading mode) to read the original at a slower speed (S18). The image data (the black and white data) previously read in the first reading mode and stored in the data memory unit 107 as the black and white data is deleted (S19). Then, the original is transported again to the reading position 3 by the transport roller 31 (S20). The operation can be done by recycling through the recycling path 19 or by feeding back in the direction opposite to the discharge direction.

When the original is returned to the reading position 3, the original starts to be read at the slower speed of the second reading mode (the color reading mode) (S21). The image data on the original (the color image data) are stored sequentially in the data memory (S22). While reading the originals, the original reading operations (S21 and S22) continue. When reading the image on the original by the second reading mode is completed (S23), the color image data stored in the data memory 107 are output to the image forming apparatus (S24). The reading operation control is performed for all originals stacked on the sheet supply tray 9 (S25 and S26).

FIG. 16 is an example of the third image reading operation control of the present invention. Here, differing from the second control method, the invention determines whether the data is in monotone or color while reading the original.

In FIG. 10, the reading operation starts after placing the original at a predetermined position on the platen (S30). Here, after the ACS mode is selected (S31), the image reading apparatus starts reading in the first reading mode (S33) when the start key is pressed (S32) on the apparatus. Data read in the first reading mode is stored (S34) in the memory as data of the first type (the black and white data). The stored data is converted from an analog signal of the original read by the line sensors 102 into a digital signal by the A/D converter unit 103, as described in FIG. 12 and FIG. 13, and is processed for the shading correction at the shading correction unit 104 and output to the selector unit 105.

Next, in the example of the third image reading operation control, which is different from the example of the second image reading operation control, it is determined whether the image data sequentially read while reading the images on the original is the first type (the black and white data) or the second type (the color data) (S35). When it is determined that the data is the first type (the black and white data)(S36), it is continued to read in the first reading mode. When it is determined that all the data is the first type (the black and white data), the image data stored in the data memory 107 is output to the image forming apparatus (S38) and the reading of the original image is completed. Then, the original is discharged to the discharge path 18.

When the image data on the original is determined to be the second type of data (the color data) (S35), the reading in the first reading mode is stopped (S37). The apparatus switches from the first reading mode to the second reading mode (the color reading mode) to read the color original at the slow speed (S39). The image data (the black and white data), which is read in the first reading mode and stored in the data memory unit 107 as black and white data, is deleted (S40).

Then, the original is returned to the predetermined reading position by the transport roller 31 (S41). The operation can be done by recycling through the recycling path 19 or by feeding back in the direction opposite to the discharge direction.

When the original is returned to the reading position 3, the original starts to be read at the slower speed of the second reading mode (the color reading mode) (S42). The image data on the original (the color image data) are stored sequentially in the data memory (S43). While reading the originals, the original reading operations (S21, S22 and S23) continue until the end. When reading the image on the original by the second reading mode is completed (S44), the color image data stored in the data memory 107 are output to the image forming apparatus (S45). When a single sheet of the original is completed to read, the color image data stored in the data memory 107 are output to the image forming apparatus (S24). The reading operation control is performed for all originals stacked on the sheet supply tray 9 (S27).

Thus, according to the third and fourth embodiments of the present invention, the image reading apparatus is provided with the optical reading device disposed at the predetermined reading position under the platen for reading the original moving on the platen; the transport device capable of re-feeding the same original to the reading position; the detecting device for determining the type of image data on the original read by the optical reading device; and the control device for control the other devices. The control device controls the other devices such that when the image data is the first type, the image data using the first reading mode is output. Further, when the image data is the second type, the original is transported (re-fed) to the reading position again to be read the image data using the second reading mode that is different from the first reading mode.

According to the present invention, the image reading apparatus reads the image data on the original being transported by the ADF. When reading the, first type of original, for example a monotone original, the image data obtained in the initial reading operation, will be used, thereby eliminating the second scanning. Therefore, it is possible to read a set of the originals containing both monotone originals and color originals at a high speed. Also, according to the present invention, both when reading the original using the ADF and when reading the original placed stationary on the platen 8, the black and white images are read while determining the type of originals. Thus, only when the color original is read in the color reading mode again, it is possible to read the originals at higher processing speeds.

While the invention has been explained with reference to the specific embodiments of the invention, the explanation is illustrative and the invention is limited only by the appended claims.

What is claimed is:

1. An image reading apparatus for reading an image on an original, comprising: comprising:
    a platen for setting the original immovably;
    reading means arranged under the platen for reading the original placed on the platen, said reading means moving along the platen and comprising a line sensor for reading the original line by line from a reading start position;
    drive means connected to the reading means for moving the same at a first moving speed for reading the original by a monotone image data reading mode or a second moving speed for reading the original by a color image data reading mode;
    detection means electrically connected to the reading means for determining line by line whether the image read by the line sensor is monotone data or color data based on the output from the line sensor;
    data memory for memorizing image data from the line sensor sequentially, and
    control means electrically connected to the reading means, drive means, data memory and the detection means for controlling the same so that in reading the original by the reading means in the monotone image data reading mode, the reading means continues to read the original at the first moving speed when the image data read by the line sensor at the first moving speed is determined to be the monotone data, and when the image data read at the first moving speed is determined to be the color data, monotone data in the data memory is deleted, reading of the original by the monotone image data reading mode is stopped, the reading means is moved to the reading start position or a position without containing the color image, the driving means is moved at the second moving speed and the original is read by the color image data reading mode.

2. An image reading apparatus according to claim 1, wherein said control means includes scanning control means for storing the image data read at the first moving speed, and switching control means for switching the driving means to the second moving speed when the detection means determines the image data read at the first moving speed to be the color data.

3. An image reading apparatus according to claim 2, wherein said first moving speed is faster than the second moving speed.

4. An image reading method for reading an image on an original on a platen of an image reading apparatus, comprising the steps of:
    reading said original line by line in a monotone image data reading mode by the image reading apparatus to obtain image data;
    determining said image data line by line to be monotone image data or color image data;
    continuing the reading of said image data by the monotone image data reading mode when the image data line by line is determined to be the monotone image data;
    stopping the reading of said original in the monotone image data reading mode when the image data is determined to be the color image data;
    returning the image reading apparatus to a first reading position or a position without containing a color image when the image data is determined to be the color image data; and
    moving the image reading apparatus returned to the first reading position or the position without containing the color image at a color image data reading mode along the platen, and reading the image at the color image data reading mode.

5. An image reading method according to claim 4, wherein said color image data reading mode is slower than the monotone image data reading mode.

* * * * *